United States Patent [19]
Link et al.

[11] Patent Number: 5,768,962
[45] Date of Patent: Jun. 23, 1998

[54] MULTIPLE-SPINDLE TURNING MACHINE

[75] Inventors: Helmut Link, Aichwald; Guenther-Heinrich Trautmann, Kirchheim, both of Germany

[73] Assignee: Index-Werke GmbH & Co. KG Hahn & Tessky, Germany

[21] Appl. No.: 726,416

[22] Filed: Oct. 7, 1996

Related U.S. Application Data

[63] Continuation-in-part of PCT/EP96/00495 Feb. 6, 1996.

[30] Foreign Application Priority Data

Feb. 10, 1995 [DE] Germany ......................... 195 04 370.7

[51] Int. Cl.[6] .................................................... B23B 9/04
[52] U.S. Cl. ................................................. 82/129; 82/3
[58] Field of Search ........................... 82/129, 131, 123; 29/36, 40, 37 R, 37 A, 38 R, 38 B, 38 A

[56] References Cited

U.S. PATENT DOCUMENTS

| 3,180,188 | 4/1965 | Borwn ........................................ 82/129 |
| 3,339,440 | 9/1967 | Toyosuke ................................... 82/129 |
| 3,693,485 | 9/1972 | Maurer ....................................... 82/129 |
| 3,726,162 | 4/1973 | Sato ............................................... 82/3 |
| 5,083,485 | 1/1992 | Link et al. ................................. 82/124 |

FOREIGN PATENT DOCUMENTS

| 1 925 432 | 7/1965 | Germany . |
| 25 28 001 | 9/1976 | Germany . |

*Primary Examiner*—Daniel W. Howell
*Assistant Examiner*—Mark Williams
*Attorney, Agent, or Firm*—Barry R. Lipsitz; Ralph F. Hoppin

[57] ABSTRACT

In order to improve a multiple-spindle turning machine comprising a machine frame, two cylinders arranged on opposite sides of an operating area and mounted on the machine frame to be respectively rotatable around an essentially horizontal rotational axis, machining means arranged on the cylinders in respective individual positions with central axes aligned essentially parallel to the rotational axis, and tools for machining work pieces held in at least one portion of the machining means, in such a way that it may also be used as universally as possible for other work pieces, it is proposed that the cylinders are rotatable around their rotational axis independently of one another relative to the machine frame.

24 Claims, 15 Drawing Sheets

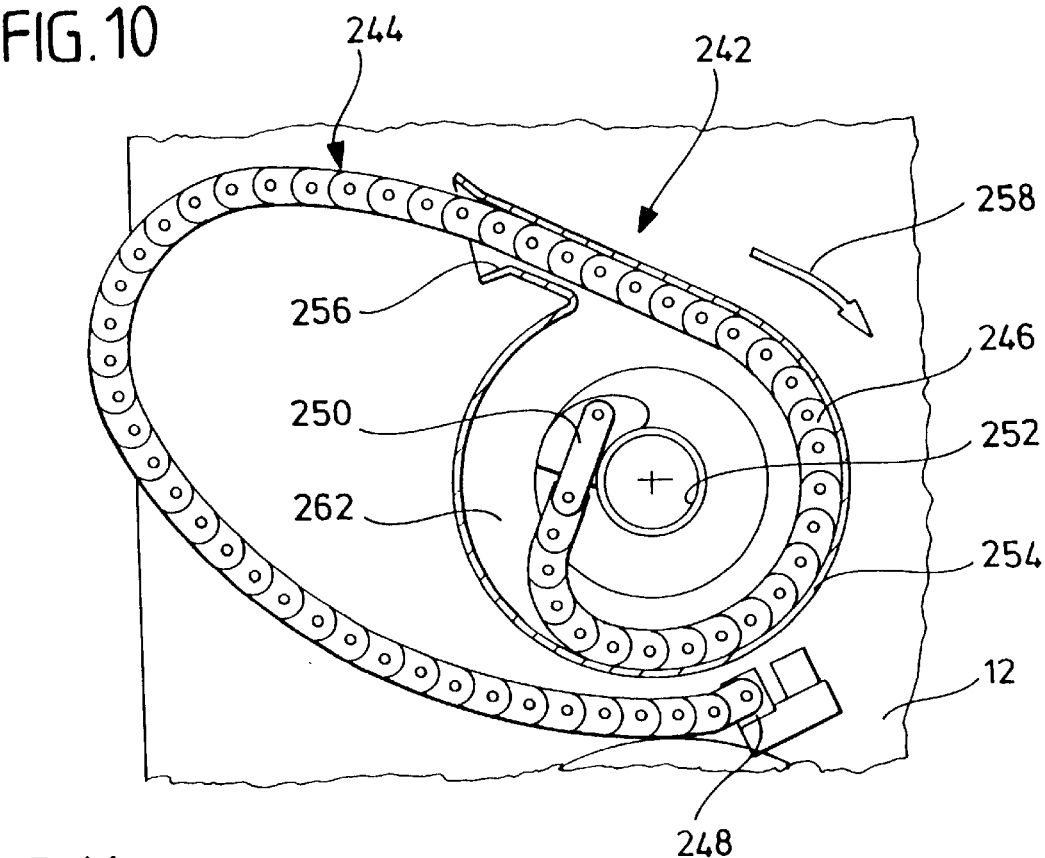
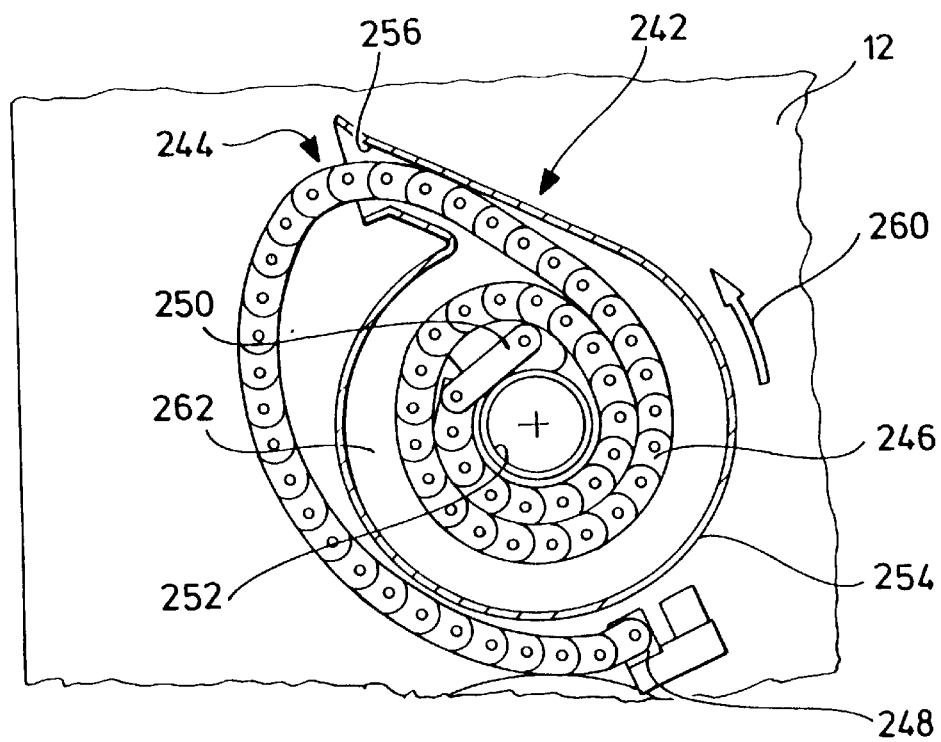

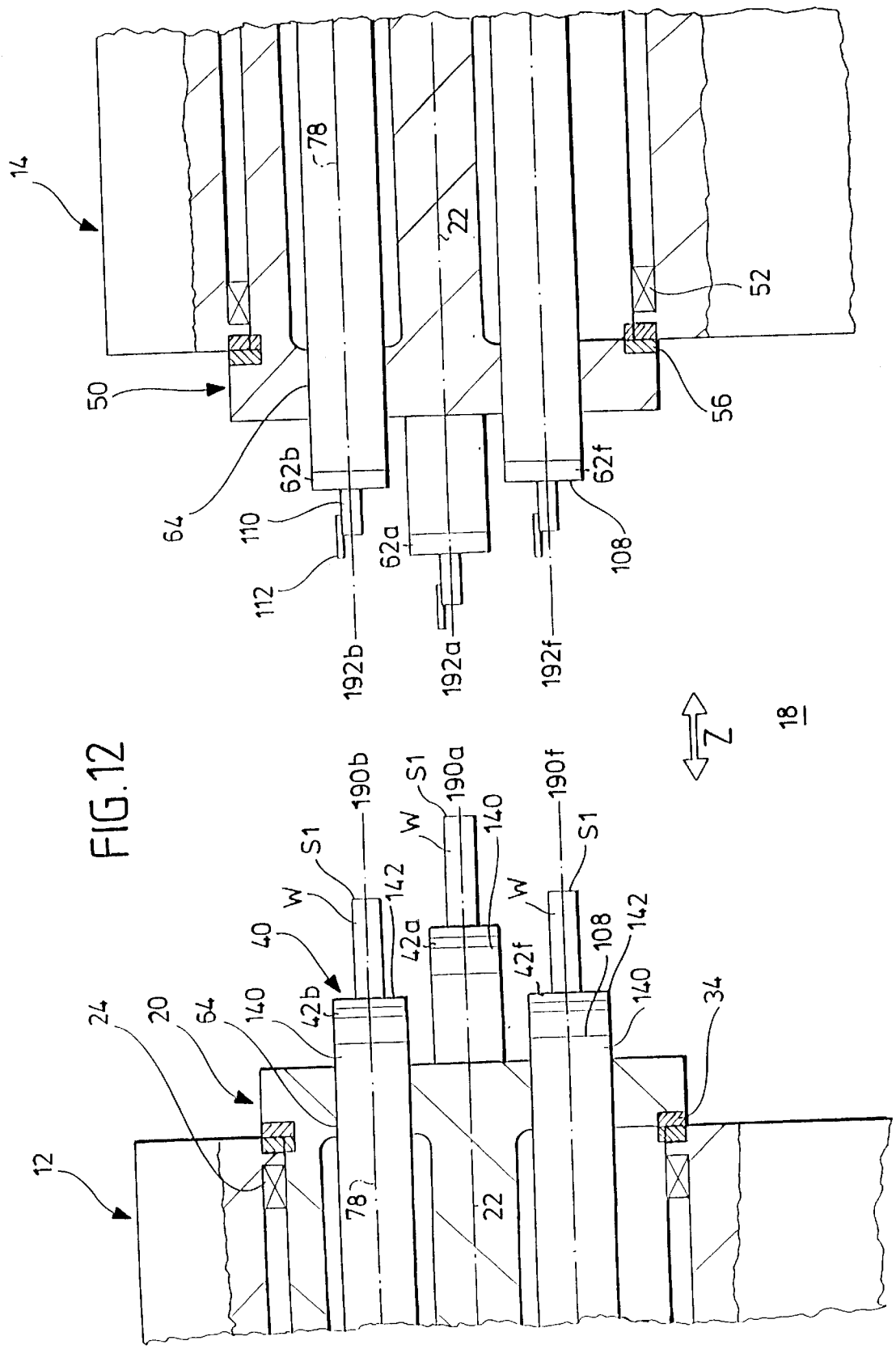

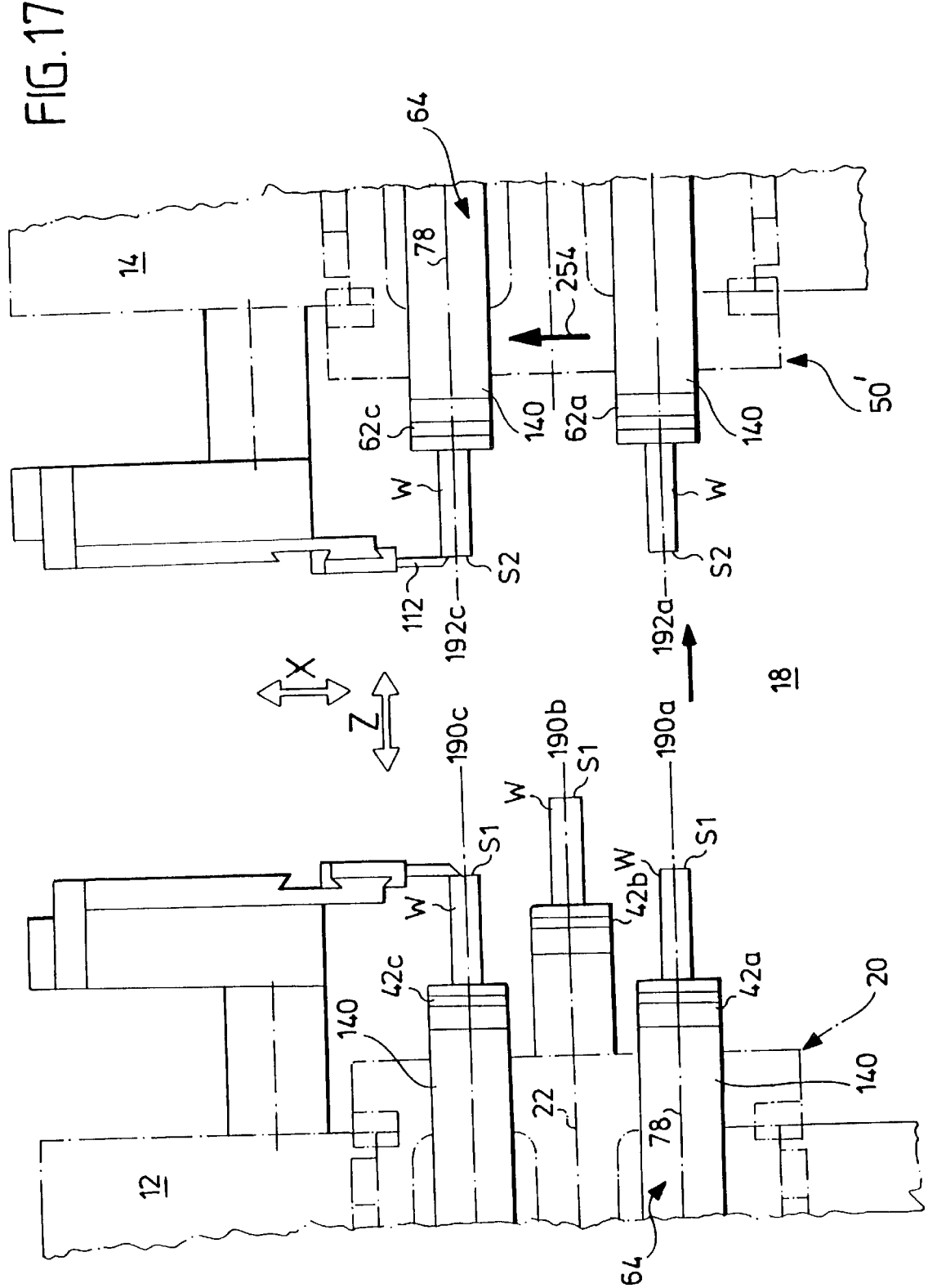

MULTIPLE-SPINDLE TURNING MACHINE

This application is a continuation-in-part of PCT/EP96/00495 Feb. 6, 1996.

BACKGROUND OF THE INVENTION

The invention relates to a multiple-spindle turning machine comprising a machine frame, two cylinders arranged on opposite sides of an operating area and mounted on the machine frame to be respectively rotatable around an essentially horizontal rotational axis, machining means arranged on the cylinders in respective individual positions with central axes aligned essentially parallel to the rotational axis, and tools for machining work pieces held in at least one portion of the machining means.

Such a multiple-spindle turning machine is known from the publication DE-OS 25 28 001, for example. In the multiple-spindle turning machine disclosed in this publication, a cylinder and counter-cylinder are arranged on opposite sides of the operating area, however the cylinder and counter-cylinder are rigidly coupled by a central shaft connected to the cylinders so as to be rotationally fixed, in which case guides for the work pieces to be machined additionally sit on this shaft.

This solution has the great disadvantage that the machining possibilities provided on such a multiple-spindle turning machine are essentially restricted to the machining of shaft parts illustrated in this publication.

Therefore, the object of the invention is to improve a multiple-spindle turning machine of the aforementioned type so that it may also be used as universally as possible for other work pieces.

SUMMARY OF THE INVENTION

This object is achieved according to the invention with a multiple-spindle turning machine of the above-described type in that the cylinders are rotatable around their rotational axis independently of one another relative to the machine frame.

The solution according to the invention in particular provides the possibility of using the large number of machining means available in the cylinders in an optimum manner and in order to reduce the piece rate.

This solution has the great advantage that, because the cylinders are no longer rigidly coupled to one another, a plurality of additionally possible machining operations is provided, since it is, for example, possible to rotate the cylinders independently of one another and thus move the machining means in each cylinder independently of one another from one rotational position or station into the next, so that the periods in which the machining means of a cylinder stay in one rotational position or station for machining by means of tools allocated to the station are independent of the periods in which the machining means of the other cylinder stand in a rotational position or station provided for this to carry machining operations with the tools allocated to this rotational position or station.

For example, it is possible to machine with one and the same tool work pieces which are held in a station of the machining means of a cylinder, and subsequently using the same tool machine work pieces which are held in the opposite station of the machining means of the other cylinder.

In the above-described solution, a mechanical connection may also be provided, in principle, to stabilise the rotational mounting of both cylinders passing through the operating area located between faces of the cylinders facing one another.

However, the solution according to the invention is particularly advantageous if the operating area located between faces of the cylinders facing one another is free from mechanical connections between the cylinders, so that machining of work pieces is considerably simplified, since there is an additional amount of space available, in particular radially inside the positions of the machining means, for example, to use tool holders with several tools and in this case position a tool which is not needed in the section of the operating area located radially inside the machining means or to use this section of the operating area to direct a tool through this to a work piece in one of the machining means.

Moreover, the absence of any mechanical connection between the cylinders in the operating area located between the faces facing one another has the additional advantage that cuttings may drop freely and a plurality of measures for removing cuttings from the mechanical connections can be dispensed with.

Purely on principle, it would also be possible to provide a joint drive motor for both cylinders and provide a coupling with a corresponding gear for each cylinder so that these may move independently of one another. However, the concept according to the invention is carried out particularly consistently if each of the cylinders can be driven by its own rotary drive since this constitutes a substantially simpler and also cheaper solution structurally, and moreover the dimensioning of the operating area beyond the faces of the cylinders can be achieved without geometric restrictions as a result of the drive solution.

Particular advantages with respect to the structure of the multiple-spindle turning machine result if each cylinder is provided with the allocated rotary drive in a stand of the machine frame provided for the cylinder, and each stand forms a modular unit of the machine frame with the cylinder and the rotary drive.

In principle—as known from the prior art, for example—the rotary drives could be constructed as Maltese cross rotary drives, with which each cylinder may be driven stepwise around a predetermined angle in order to move the machining means in particular from station to station.

However, it is particularly advantageous if the rotary drives for the cylinders are constructed as numerically controlled C-axis drives, since these provide the possibility of moving the cylinders in any desired rotational angles independently of the predetermined rotational angles, and also execute quick motion movements around any desired angle with the cylinders, and additionally, if the cylinders are to be capable of being fixed in individual rotational positions, provide the further possibility of bringing these cylinders into the respective rotational position with high precision in order to fix them more quickly.

In order to fix the cylinders in individual rotational positions, a serration is preferably provided between the respective cylinder and the machine frame, and in the case where the cylinders are rotatable by means of a numerically controlled C-axis drive, the serration can be constructed in such a way that it may be retracted more quickly than in known Maltese cross rotary drives so that the idle periods when machining the work pieces in the multiple-spindle turning machine according to the invention can be shortened.

To provide the further possibility of machining one and the same part with machining means located opposite one another or of transferring it from one machining means of one cylinder into the machining means of the other cylinder, it is preferably provided that the rotary drives of both cylinders may be correlated with one another via a control means.

In the simplest case, the correlation of the rotary drives may only concern a single rotational position of the two cylinders, however it may also be taken so far that the two cylinders at least partially execute a rotational movement synchronised to one another, e.g. in order to move a work piece held by opposing machining means jointly over a predetermined angle range and to machine it in a spindle station or also during a rotation of the cylinders.

No further details have thus far been given with respect to the arrangement of the cylinders themselves. Therefore, it would be conceivable, for example, to arrange the rotational axes of the two cylinders so that they run parallel to one another, but not coaxially to one another, so that in one or two rotational positions of the spindle cylinders, for example, machining means are located opposite one another. However, it is particularly advantageous, in particular to obtain as compact a structure of the multiple-spindle turning machine as possible, if the rotational axes of the two cylinders coincide, i.e. both cylinders are rotatable coaxially to one another.

No further details have thus far been given with respect to the arrangement of the machining means itself on the respective cylinder. Therefore, an advantageous embodiment provides that the machining means of a cylinder are arranged with their central axes at essentially the same radial distance from the rotational axis. This results in the possibility of machining work pieces in the individual stations in machining means coming into these stations using the same tool adjustment.

To be able to also advantageously machine the work pieces held in the machining means in fixed stations, it is provided that the machining means of a cylinder are arranged around the rotational axis at the same angular distance from one another, and in the same manner the individual spindle stations are likewise arranged at the same angular distance or at a whole multiple of this angular distance so that several machining means stand, for example, constantly in one of several stations.

In principle, the machining means in the two different cylinders could be at a different radial distance from the rotational axis of the respective cylinder, in which case, however, cooperation between two machining means, each of which being arranged on a different cylinder, would only be possible if the cylinders are not rotatable around the same rotational axis, but around rotational axes offset parallel to one another.

Therefore, it is particularly advantageous if the machining means are arranged on the two cylinders at the same radial distance from the rotational axis of the respective cylinder.

No further details have so far been given with respect to the number of machining means provided on the individual cylinders. Hence, an embodiment according to the invention provides that the number of the machining means on the first cylinder is equal to the number of machining means on the second cylinder.

It is advantageous in this case if the machining means are arranged at equal angular distances on the two cylinders so that it is possible to respectively position a machining means of one cylinder and a machining means of the other cylinder in stations corresponding to one another.

This solution will be used in particular if at least in one portion of the stations the two machining means are required for machining the work piece, whether the work piece is held by both machining means or by one machining means and guided by the other.

However, in the case of a plurality of work piece machining means, e.g. in machining operations on the front and rear sides of work pieces, the number of machining means on one side of the work piece is smaller than the number of machining means on the other side of the work piece.

For this reason, it is often unnecessary and even unfavourable to provide the same number of machining means in both cylinders. Therefore, in an embodiment of the solution according to the invention it is expediently provided that the number of machining means on one cylinder is smaller than the number of machining means on the other cylinder. In an extreme case, it would be conceivable to provide only one machining means on one cylinder, while a plurality, e.g. six or eight, machining means may be provided on the other cylinder.

Even this one machining means on one cylinder allows so far unknown machining possibilities, i.e. because the one machining means on the one cylinder takes the work piece from one of the machining means of the other cylinder in a rotational position, if necessary fully machines it in this or another rotational position, and in this or another rotational position deposits it in an unloading means, while using the machining means of the other cylinder, further machining operations are being carried out on work pieces or a work piece is being taken up from a loading means.

No further details concerning the type of machining means have been given thus far in association with the previous embodiments. Hence, an advantageous embodiment provides that at least one portion of the machining means is constructed as a work piece spindle.

A further advantageous variant which may be used in a variety of ways provides that the machining means of one cylinder are constructed as work piece spindles in order to hold these work pieces for machining.

However, alternatively hereto, there is also the possibility, for example, of allocating a machining means, which is not constructed as a work piece spindle, to a machining means constructed as a work piece spindle for machining the work piece, in which case the allocation is dependent on the type of machining of the work piece.

In association with the previous explanation of the individual embodiments, there has been no discussion how the machining means are arranged in relation to the respective cylinder. For example, it is conceivable to arrange the machining means firmly on the cylinder. Particularly in the case where two machining means located opposite one another are to cooperate with one another, an advantageous solution provides that at least one of the machining means is movable relative to its cylinder in the direction of its central axis.

Moreover, it is advantageous in the case where machining means are constructed as work piece spindles if these are movable relative to the cylinder in the direction of their central axis forming a spindle axis, since this makes it possible to carry out the machining of the work piece held in this work piece spindle by relative displacement in the direction of the Z-axis because the work piece spindle is movable relative to its cylinder. Such movability of the work piece in the direction of the Z-axis provides the advantage of higher rotational and cylindrical precision of the work piece produced with such a work piece spindle.

In particular in the case where several machining means are respectively movable in the direction of their central axis, it is advantageous if the machining means are movable independently of one another in the direction of their central axis relative to the respective cylinder, since this provides the possibility of moving the machining means in keeping with the desired machining operation and no attention needs to be paid to the machining operations provided with different machining means.

Of particular advantage is a solution in which each machining means movable in the direction of its central axis is allocated its own linear drive for movement of same in the direction of the central axis, since this is a particularly simple solution for independent mobility of the machining means.

It is particularly expedient, in particular with respect to the precision of positioning the machining means, if each machining means is constantly coupled to the linear drive, since as a result there would no longer be any of the problems known, for example, from the solution disclosed in DE-OS 25 28 001 in the case of coupling the respective linear drive to the respective machining means for displacement thereof, and therefore the problems associated with this regarding the precision of positioning the machining means would be eliminated.

The linear drive for displacement of the machining means could also be constructed as a disc cam-controlled drive—in a similar manner to that in DE-OS 25 28 001. However, it is particularly advantageous if the machining means can be specifically positioned and fixed with respect to its position in the direction of the central axis by means of the linear drive, so that duplicating turning operations may also be carried out, for example, which are not possible with disc cam-controlled drives, since these only allow exact positioning of the machining means in one direction, and not in the opposite direction.

For example, the linear drive is constructed as a spindle motor for this.

In order to attain as high a precision as possible when machining the work pieces, it is provided that each machining means is itself solely linearly movable as a whole relative to the cylinder, which provides the possibility of a simple, but very precise guidance of the machining means.

The linear drive is preferably arranged on the respective cylinder, in which case it also has a drive motor arranged on the respective cylinder.

In order to keep radial extension of the cylinder as low as possible and to obtain as compact a structure as possible, it is provided that the linear drive is arranged to lie radially outside the respective machining means on the cylinder.

The structure is particularly compact if the linear drive is arranged offset at an angle to the respective machining means relative to the rotational axis, and this arrangement is hereby optimised by arranging the linear drive in an angled interstice between two machining means.

In principle, the cylinders could be further rotatable in any desired direction of rotation, as is the case, for example, in the multiple-spindle turning machine described initially.

However, it is particularly advantageous if each of the cylinders may be rotated from an initial position around a maximum angle as far as an end position in one direction and then back again into the initial position, and a flexible supply strand, which follows the rotational movement around the maximum angle, is respectively directed from the machine frame to the respective cylinder. This solution has the great advantage that the machining means and the linear drives for movement of the machining means may be constantly supplied via the flexible supply strand without rotational leads being necessary for this and so that the supply may also be maintained during rotation of the respective cylinder, thus allowing a changed actuation of the respective machining means to already be achieved during rotation of the respective cylinder, or actuation of the linear drive in order to already position the machining means for the next machining operation, or also to prevent the machining means from colliding with a tool arranged upright on the machine frame.

It is particularly expedient here if the respective cylinder passes through the individual provided machining means during rotation in one direction from the initial position into the end position, but then rotates back from the end position into the initial position in one action in quick motion, and then in turn passes through the individual machining means from the initial position in the direction of the end position.

However, alternatively it is also possible to likewise pass through individual machining means with each cylinder during the return movement from the end position into the initial position.

This solution is particularly advantageous in association with the independent mobility of the individual spindle cylinders according to the invention, since then different movements are also possible with the individual spindle cylinders during the return movement from the end position into the initial position.

Further features and advantages of the invention are the subject of the following description as well as of drawings of some embodiments.

BRIEF DESCRIPTION OF THE DRAWINGS

FIG. 10 is a section taken along line VII—VII in FIG. 1 with the cylinder in initial position;

FIG. 11 is a section similar to FIG. 10 with the cylinder in end position;

FIG. 12 is a sectional schematic representation of a machining operation of a work piece in a first version;

FIG. 17 is a sectional schematic representation of a machining operation of a work piece in the fifth version.

DETAILED DESCRIPTION OF THE INVENTION

Figure 1:
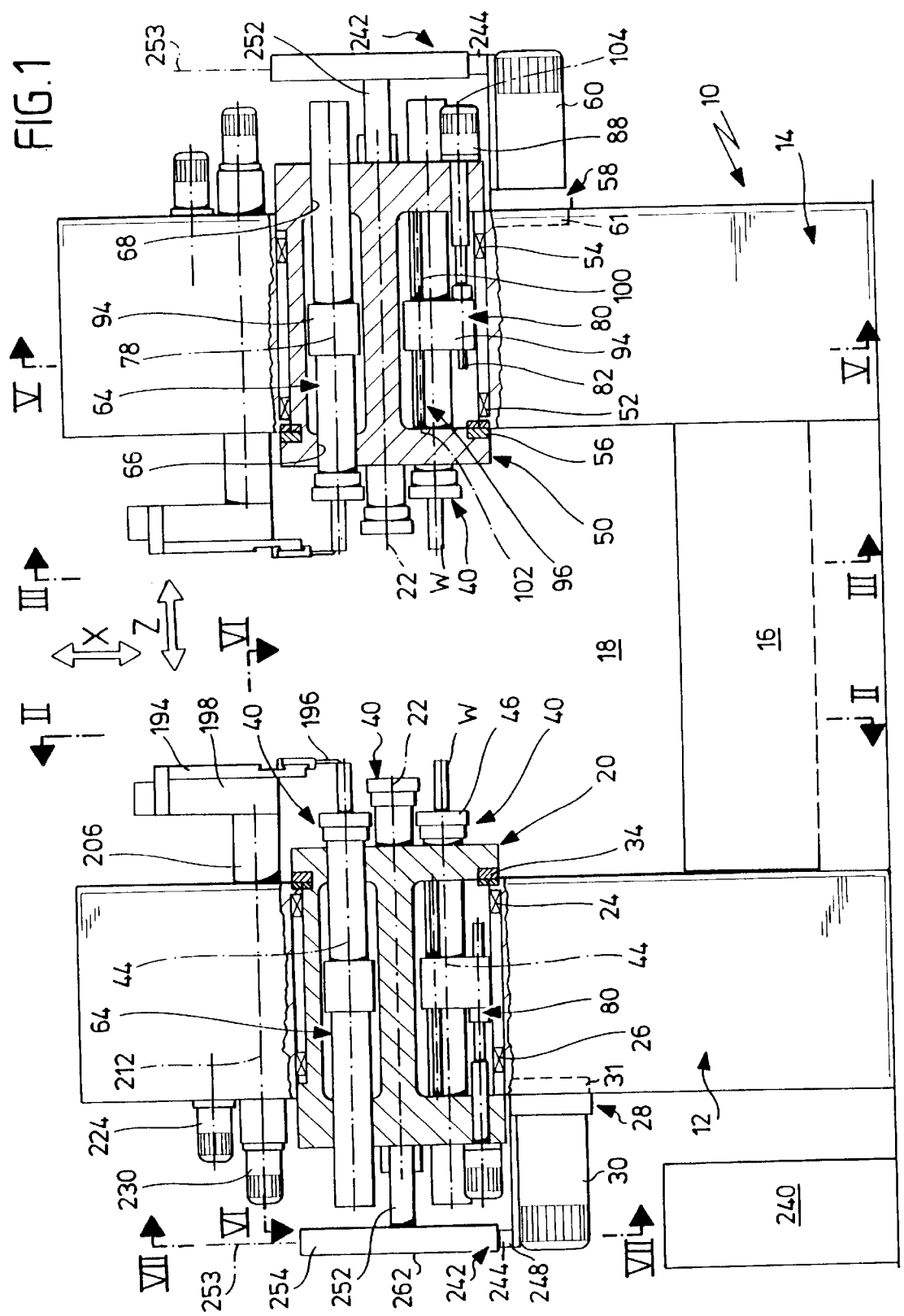
FIG. 1 shows a side view of a multiple-spindle turning machine in partial section taken along line I—I in FIGS. 2 and 3 with machining means shown, for example, in the form of work piece spindles.

An embodiment of a multiple-spindle turning machine according to the invention, shown in FIG. 1, has a machine frame given the overall reference 10, comprising a first stand 12 and a second stand 14, which are connected to one another by means of a base part 16. An operating area given the overall reference 18 is located between the stands 12, 14.

A first cylinder, given the overall reference 20, with a front cylinder bearing 24 facing the operating area 18 and a rear cylinder bearing 26 on a side of the first stand 12 facing away from the operating area 18, is mounted in the first stand 12 to rotate around a horizontal rotational axis 22. A rotary drive, given the overall reference 28, comprising a drive motor 30 and a toothed belt transmission 31, for example, with which the cylinder 20 may be driven in the region of the rear cylinder bearing 26, is provided to rotate the cylinder 20. In this case, the rotary drive 26 is preferably constructed as a numerically controlled rotational shaft member, with which the cylinder 20 may be positioned precisely in any rotational position.

On the side of the first stand 12 facing the operating area 18, a three-part serration 34 active between the first stand and the cylinder 20 is provided to fix the individual rotational positions of the cylinder 20, and said serration is located between the front cylinder bearing 24 and the operating area 18 and may be operated hydraulically.

Figure 2:
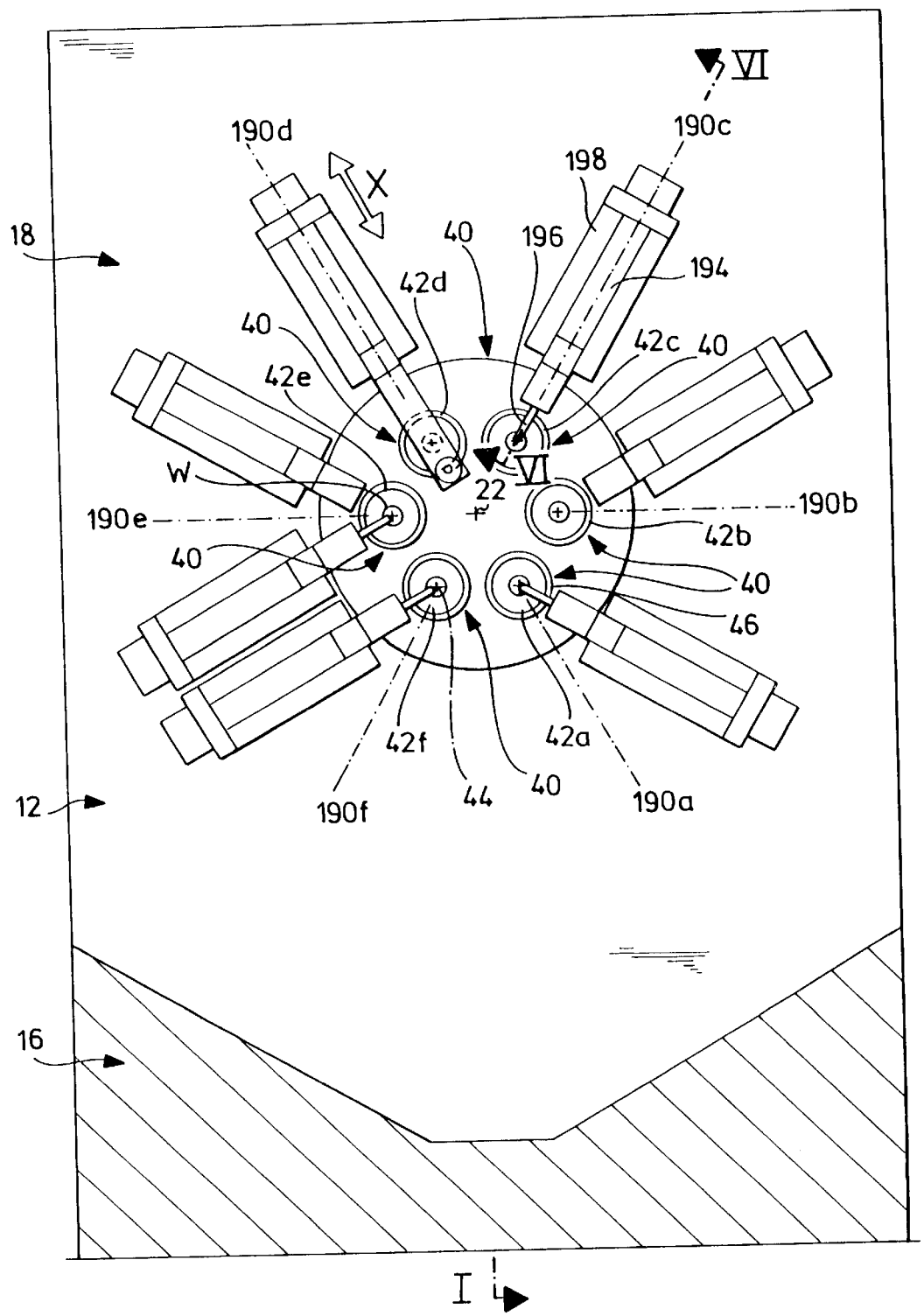
FIG. 2 is a section taken along line II—II in FIG. 1.

As shown in FIGS. 1 and 2, a plurality of first machining means 40, e.g. constructed as work piece spindles, are arranged on the cylinder 20 in individual positions 42a, 42b, 42c, 42d, 42e and 42f, in which case the machining means 40 are at the same radial distance from the rotational axis 22 in each of the positions 42a and all positions lie at the same angular distance around the rotational axis 22.

All the machining means 40, moreover, extend with their central axis 44 parallel to the rotational axis 22 and therefore also extend in horizontal direction, and are arranged in such a way that a machining element 46, e.g. a work piece chuck, enclosed by the machining means 40 faces the operating area 18 so that a work piece W clamped therein can be machined in the operating area 18.

In the second stand 14, a second cylinder 50, which is mounted to rotate coaxially to the rotational axis 22 in the second stand 14 by a front cylinder bearing 52 facing the operating area 18 and a rear cylinder bearing 54 on a side of the second stand 14 facing away from the operating area 18, is arranged as a support for further machining means 40. In this case, a rotary drive 58 with a drive motor 60 and a toothed belt transmission 61, which drives the second cylinder 50 in the region of the rear cylinder bearing 54, is provided to rotate the second cylinder 50. The rotary drive 58 is preferably also constructed a numerically controlled rotational shaft member so that the cylinder 50 may be exactly positioned in any desired rotational position.

On the side of the second stand 14 facing the operating area 18, a three part serration 56 active between the second stand and the counter-cylinder 50 is provided to fix the individual rotational positions of the cylinder 50, and said serration is located between the front cylinder bearing 52 and the operating area 18 and may be operated hydraulically.

Figure 3:
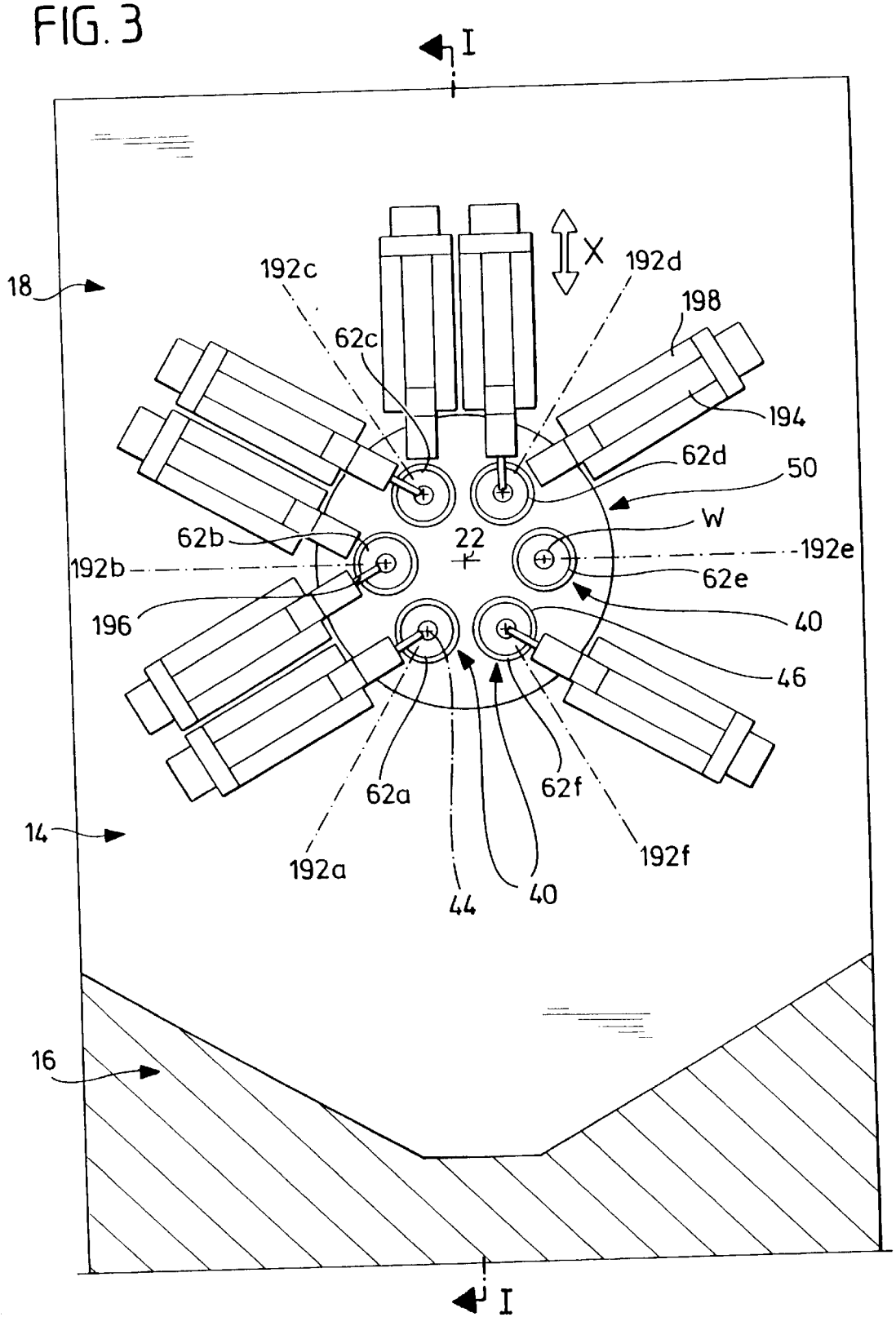
FIG. 3 is a section taken along line III—III in FIG. 1.

As shown in FIG. 3, six positions 62a to f are provided in the second cylinder, in which case the individual positions 62a to f are arranged at the same radial distance from the rotational axis 22 and, for example, at the same angular distance relative to one another as positions 42a to f. Machining means 40 with central axes 44, which are aligned parallel to the rotational axis 22 and may be of a wide variety of types, are arranged in these positions 62a to f.

Each of the machining means 40 is arranged in a sleeve 64, and said sleeve 64 passes through guide openings 66 and 68 in a front bearing plate 70 or a rear bearing plate 72 of the first cylinder 20 or the second cylinder 50 and is either firmly installed in the guide openings 66 and 68 or is guided displaceably parallel to the rotational axis 22 by means of linear guides 74 and 76 in the direction of the central axis 78, which coincides with the central axis 44 of the machining means 40.

Figure 4:
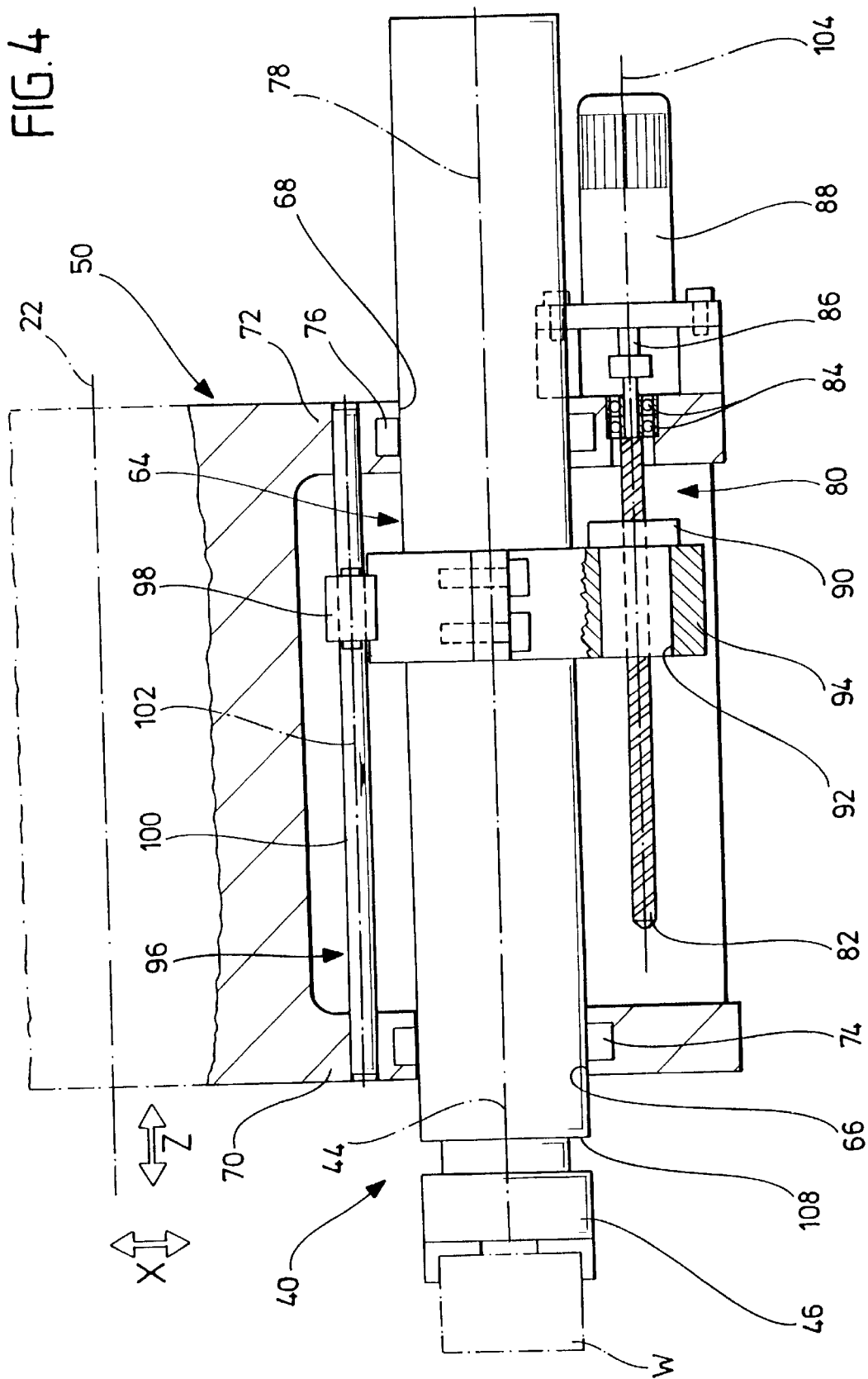
FIG. 4 is a sectional representation enlarged in some sections through a cylinder in FIG. 1.

For defined displacement of the sleeve 64 relative to the cylinder 20 and/or cylinder 50, a linear drive, given the overall reference 80 in FIG. 4, is provided which comprises a ball screw spindle 82, which extends between the bearing plates 70 and 72 and which is mounted on the rear bearing plate 72 with an axial and radial bearing 84 and is directly connected to a motor shaft 86 of a drive motor 88, which is arranged on a side of the rear bearing plate 72 facing away from the front bearing plate 70 and held on this rear bearing plate. The ball screw spindle 82 itself passes through a ball screw nut 90 arranged in a passage 92 of the arm 94 which itself engages around the sleeve 64 on its outside and is immovably fixed to this. The arm 94 is preferably guided on a side opposite the linear drive 80 in a longitudinal guide, given the overall reference 96, which has a guide body 98, which itself slides on a guide bar 100, and said guide bar 100 extends with its longitudinal axis 102 parallel to the central axis 78 of the sleeve 64 and parallel to the rotational axis 22 and is held in the front and rear bearing plate 70 and 72 of the counter-cylinder 50. The longitudinal guide 96 in this case serves to guide the sleeve 64 on the counter-cylinder 50 so that it is rotationally fixed while being longitudinally displaceable in the direction of the central axis 79.

Figure 5:
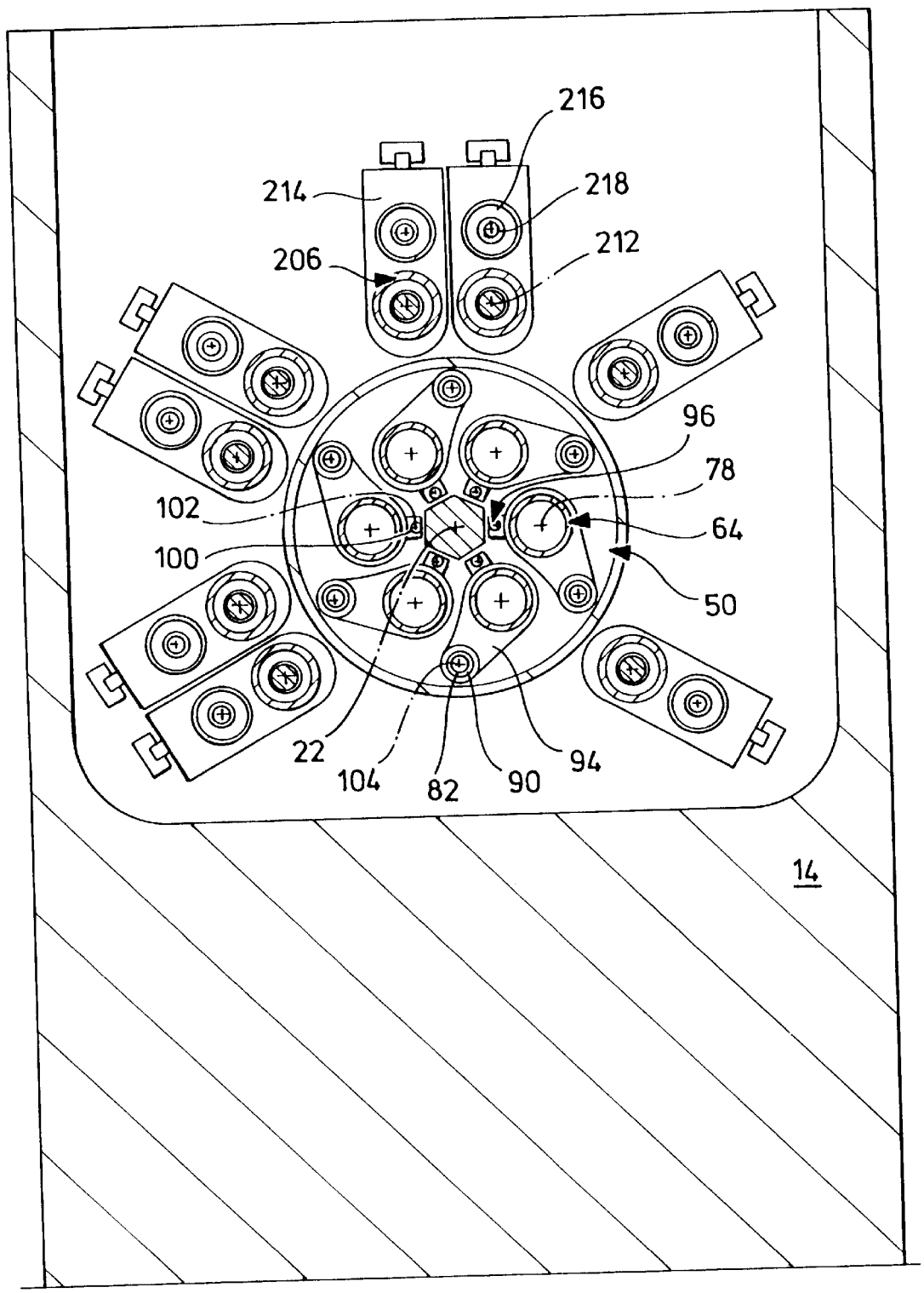
FIG. 5 is a section taken along line V—V in FIG. 1.

As shown in FIG. 5, the linear drive 80 is preferably arranged so that its longitudinal axis 104 is disposed centrally in an angle range between the central axes 78 of two consecutive sleeves 64, and preferably staggered in relation to these two sleeves 64.

The longitudinal guide 96 is preferably arranged on a side of the respective sleeve 64 facing the rotational axis 22, as is also shown in FIG. 5.

Figure 6:
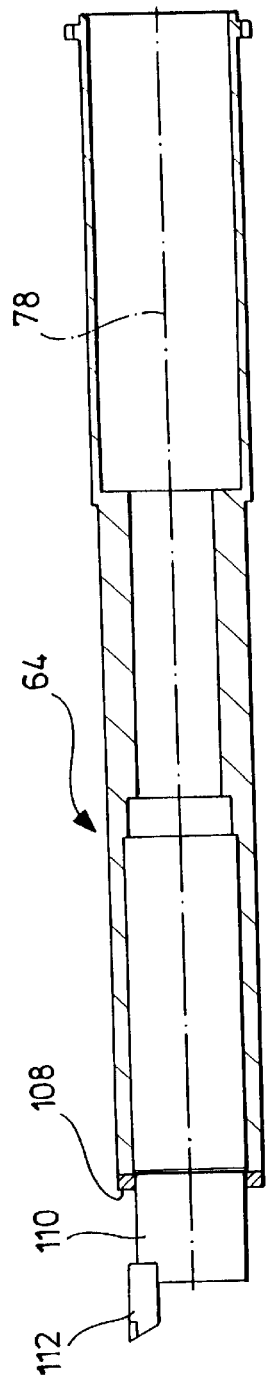
FIG. 6 is an enlarged representation of a first embodiment of a machining means according to the invention.

The machining means 40 can be constructed in a wide variety of ways. For example, a simple tool 112, which is firmly anchored in the sleeve 64 by a tool holder 110 and which is movable towards the work piece ill the opposite machining means 40 constructed in the form of a work piece spindle, for example, in a sleeve 64—as shown in FIG. 6—in which case the rotational position of the tool 112 relative to the central axis 78 is clearly fixed by the rotatably fixed positioning of the sleeve 64 in the cylinder 50.

Figure 7:
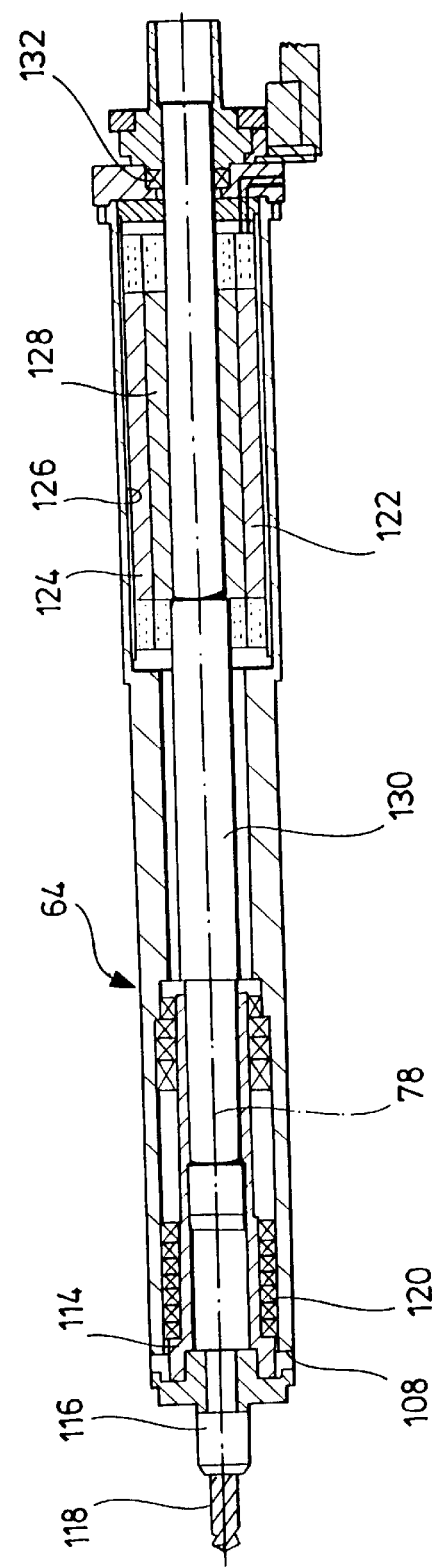
FIG. 7 is an enlarged representation of a second embodiment of a machining means according to the invention.

A second possibility of a machining means according to the invention, shown in FIG. 7, comprises a tool holding fixture 114, which is rotatably arranged in the sleeve 64 and into which a holder 116 of a rotating tool 118 may be inserted, said rotating tool 118 being constructed, for example, as a milling cutter.

This tool holding fixture 114 is mounted in the sleeve 64 via rotary bearings 120 to rotate around the central axis 78 and may be driven by a built-in motor 122 which is received in a region of the sleeve 64 opposite the tool holding fixture 114. In this case, a stator 124 of the built-in motor is firmly anchored in an end recess 126 of the sleeve 64, while a rotor 128 sits on a driving shaft. 130 which is rotatably mounted on the one hand on a side above the rotary bearing 120 of the tool holding fixture 114 and on the other side above an end rotary bearing 132 in the region of the end opposite the tool holding fixture 114. The driving shaft 130 in this case drives the tool holding fixture 114 which is firmly connected to it.

By displacing the sleeve 64 along its central axis 78, the rotating tool 118 may, for example, be moved towards the work piece W held in the opposite machining means 40 constructed as a work piece spindle, and at the same time this tool 118 may be driven to rotate by the built-in motor 122.

Figure 8:
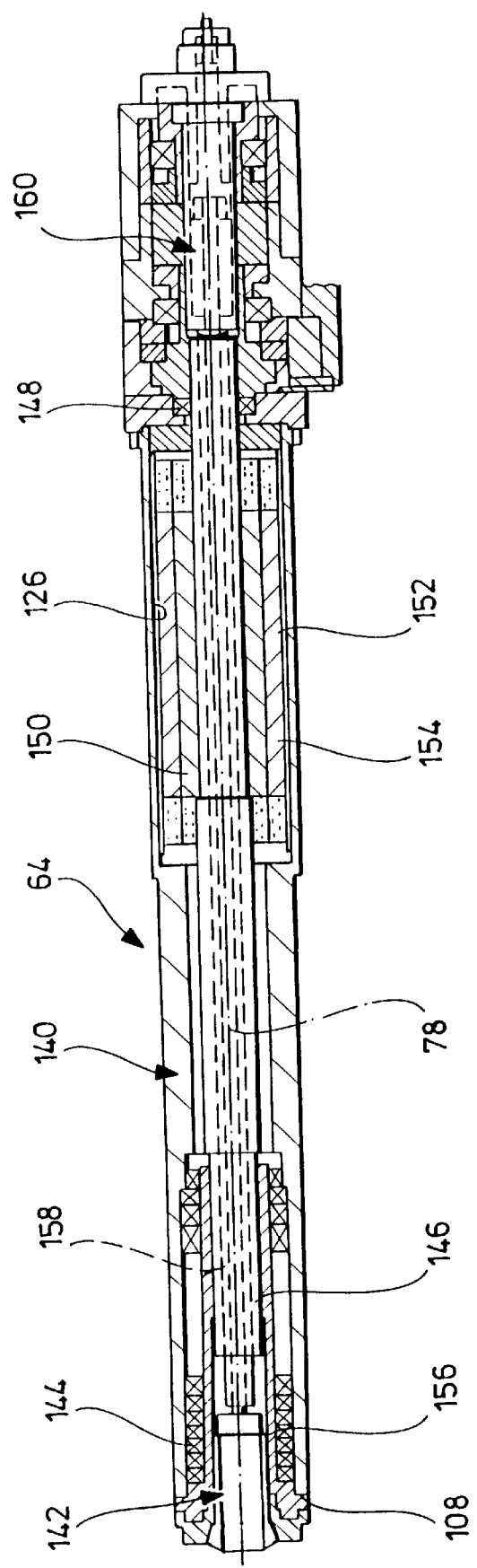
FIG. 8 is an enlarged representation of a third embodiment of a machining means according to the invention.

In a third embodiment of a machining means according to the invention, shown in FIG. 8, a work piece spindle given the overall reference 140 is arranged in the sleeve 64. This work piece spindle 140 comprises a work piece clamping element, given the overall reference 142, which is arranged in the sleeve 64 on the front side 108 thereof facing the operating area 18 and is rotatably mounted in the sleeve 64 by means of a rotary bearing 144.

In this case, the work piece clamping element 142 sits on a spindle tube 146 which passes through the entire sleeve 64 and on the rear side is likewise rotatably mounted via a rotary bearing 148 thereon, and in this case is rotatable coaxially to the central axis 78 as rotational axis. A rotor 150 of a built-in motor given the overall reference 152, sits on the spindle tube 146, and a stator 154 is in this case firmly arranged in the rear recess 126 of the sleeve 64.

To operate a collet chuck 156 of the work piece clamping element, for example, a clamping tube 158 extends from this inside the spindle tube 146 and leads to a hydraulic clamping cylinder 160, which is arranged on the opposite side of the sleeve 64 to the work piece chuck 142 so that the collet chuck 156 may be operated by the hydraulic clamping cylinder 160 via the clamping tube 158 in the usual manner.

The work piece spindle 140 inserted in the sleeve 64 may in this case be moved towards and away from the work piece W by moving the sleeve 64 in the direction of its central axis 78 towards the work piece W arranged in the opposite machining means, e.g. a work piece spindle.

Figure 9:
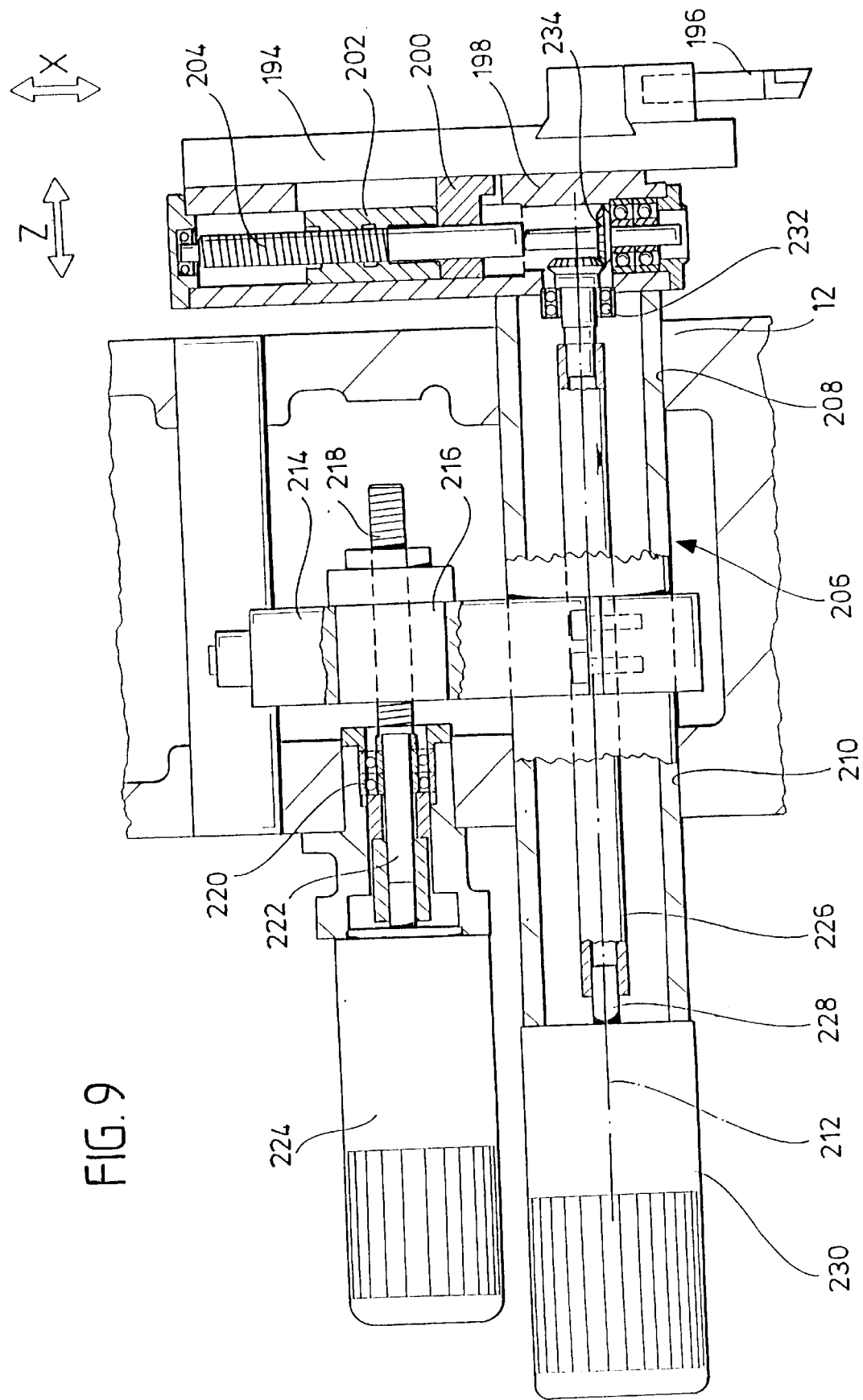
FIG. 9 is an enlarged sectional representation of a section through a tool carriage taken along line VI—VI in FIG. 2, for example.

In the shown embodiment, the machining means 40 arranged in the positions 42a to 42f and 62a to f may be positioned in different stations 190a to f and 192a to f fixed relative to the stands 12 and 14 by rotating the support 20 or 50. At the two stands 12 and 14, tool carriages 190, which are movable overall in the direction of the X- and Z-axis relative to the stands 12, 14, are allocated to one or more of the stations 192, into which the machining means 40 may be moved, and machining tools 196 are mounted on said carriages, as shown in FIGS. 1 and 9.

In this case, the tool carriage 194 sits on a carriage guide, given the overall reference 198, and is displaceable thereon transversely to the rotational axis 22 and thus also transversely to the central axes 78 of the sleeves 64, and preferably perpendicular thereto, in the direction of the X-axis. For the defined positioning of the carriage 194, it bears a mounting 200 for a ball thread nut 202 which has a ball thread spindle 204 passing through it. The ball thread spindle 204 in this case is rotatably mounted on the end side in the carriage guide 198 and so as to be axially immovable.

The entire carriage guide 198 is movable in the direction of the Z-axis and itself sits on a Z-sleeve 206, which passes through the respective stand 12 or 14 and is displaceably mounted in guides 208 and 210 of the respective stand 12 or 14 in the direction of its central axis 212 parallel to the rotational axis 22 or to the central axes 78.

For displacement of the Z-sleeve 206, this is engaged by a holder 214 bearing a ball thread nut 216, which is arranged next to the Z-sleeve 206 and which itself has a ball thread spindle 218 passing through it, in this case this ball thread spindle 218 extends inside the respective stand 12 or 14 and is aligned parallel to the central axis 212. The ball thread spindle 218 is, for example, rotatably mounted at one end in the respective stand 12, 14 by means of a rotary bearing 220 and is connected to a driving shaft 222 of a feed motor, given the overall reference 224, which protrudes on one side of the stand 12 or 14 opposite the carriage guide 198 and is held thereon.

For driving the ball thread spindle 204, a driving shaft 226, which is connected to a motor shaft 228 of a feed motor 230 and extends as far as the ball thread spindle 204, passes through the Z-sleeve 206 In this case, the driving shaft 226 is rotatably mounted on the end side of the Z-sleeve 206 in a rotary bearing 232 and is connected with respect to drive via a mitre gear 234 to the ball thread spindle 204.

Therefore, the ball thread spindle 204 is rotatable by means of the feed motor 230 and thus the transverse carriage 194 is displaceable transversely to the respective spindle axis 44 or central axis 78, while the entire Z-sleeve 206 is displaceable parallel to its central axis 212, and thus also parallel to the spindle axes 44 of the central axes 78, by the feed motor 224.

For actuation of the rotary drives 28 and 58 of the tool 196 movable in the direction of the X- and Z-axis in the individual stations 190 and 192, as well as of the machining means 40 in the individual positions 42 and 62, a machine control means, given the overall reference 240, is provided (FIG. 1).

A connection between the machine control means 240 and the machining means 40 arranged on the cylinders 20 and/or 50 is made in the case of each of the cylinders 20 and/or 50 through a supply connection 242 arranged on a side of the respective stand 12 or 14 facing away from the operating area between the machine frame 10 and the respective cylinder 20 or 50, which comprises a supply strand 244 guided in a link chain 246, in which case the supply strand 244 at one end 248 is arranged firmly on the machine frame 10 on the rear side of the respective stand 12 or 14, and at the other end is firmly connected to a tube 252 protruding over the respective cylinder 20 or 50 on the respective side opposite the operating area 18, and the supply strand 244 thereby runs in a spiral shape between the two ends 248 and 250 in a plane 253 running perpendicular to the rotational axis 22. In addition, the tube 252 is also surrounded by a worm casing 254, out of which the supply strand 244 is directed through an opening 256.

Figure 13:
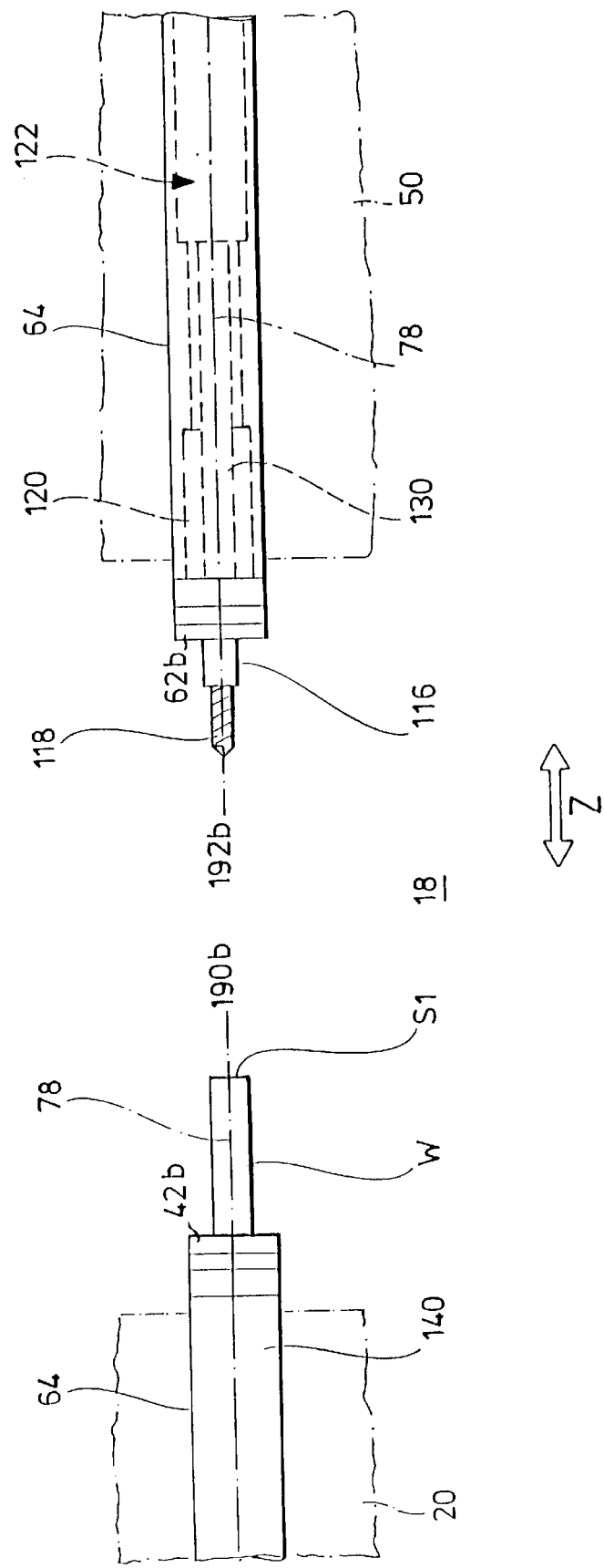
FIG. 13 is a sectional schematic representation of a machining operation of a work piece in a second version.

As shown in FIG. 10 and FIG. 11, the respective cylinder 20 or 50 is rotatable around a maximum angle of 360—360/ (number of stations) degrees, for example, in this embodiment 300 degrees, from an initial position shown in FIG. 10 in the direction of the arrow 258 into an end position shown in FIG. 13, said end position of the supply strand 244 having wound itself around the tube 252 in the form of a tight spiral. Moreover, the respective cylinder 20 or 50 is rotatable in contrary direction to the arrow 258, i.e. in the direction of arrow 260, from the end position shown in FIG. 13 into the initial position shown in FIG. 12, in which case the supply strand 244 wound in a spiral shape around the tube 252 unwinds and pushes itself out of the worm casing 254 through the opening 256.

Guide discs 262, which hold the supply strand 244 in the plane 253 running perpendicular to the rotational axis 22, are preferably provided on both sides of the worm casing 254.

As a result, the respective cylinder 20 or 50 is rotatable, for example, around the angle of 300 degrees in individual steps so that each of the machining means 40 in the positions 42 passes through all the stations 190 or 192 until the end position is reached. Subsequently, a quick rotation back into the initial position occurs without stopping in the individual stations 190 or 192, and then extending from this passage with stops in the individual stations 190 or 192 occurs.

With a multiple-spindle turning machine according to the invention, the following machining operations are now possible with the versions to be described in detail below. In a very simple version of the multiple-spindle turning machine according to the invention, each of the machining means 40 in the cylinder comprises a work piece spindle 140, in the work piece clamping means 142 of which a work piece W may be clamped (FIG. 12).

The second cylinder 50 located opposite the first cylinder comprises tools 112 facing the operating area 18, held on tool holders 110 and arranged in the sleeves 64 (FIG. 12).

The work piece W is now movable in the direction of the tool 112 by moving the work piece spindle 140 in the direction of the central axis 78 of the sleeve, this movement constituting an axis movement for machining the work piece W. The work piece W is in this case rotatably driven simultaneously by the built-in motor so that machining of the work piece W may be carried out on one side Si by the Z-axis movement between the work piece W and the tool 112.

Such machining of the work piece W is begun in station 130*a*, as shown in FIG. 12, for example, with the work piece standing in the opposite station 192*a* and maintained while the cylinders 20 and 50 are indexed on into station 190*b* or 192*b*, in which case the cylinders 20 and 50 are rotated synchronously to one another by means of the rotary drives 28 and 58 so that the machining means 40 in position 62*a* is moved from station 192*a* into station 192*b*.

For example, following this the machining may be interrupted and the work piece in the work piece spindle 140 moved from station 190*b* into station 190*c* by rotating the cylinder 20 by means of the rotary drive 28, while the machining means 40 supporting the tool 112 in position 62*a* of the cylinder 50 is moved by rotating the cylinder 50 back again into station 192*a*, in order to machine the work piece W coming out of the station 190*f* into station 190*a* again therein.

In a similar manner to the machining of work piece W by means of the tool 112, it is possible in a second version, as shown in FIG. 13, to machine the work piece W, for example, in the spindle position 190*b*, by means of the available rotating tool 118 standing in the station 192*b* which is mounted in the rotatable tool holding fixture 120, and is driven to rotate by the built-in motor 122 in the sleeve 64. In this case, the relative movement between the work piece W and the tool 118 along the Z-axis is also achieved by displacing the work piece spindle 140 in the sleeve 64 in the manner described in conjunction with FIG. 12.

Figure 14:
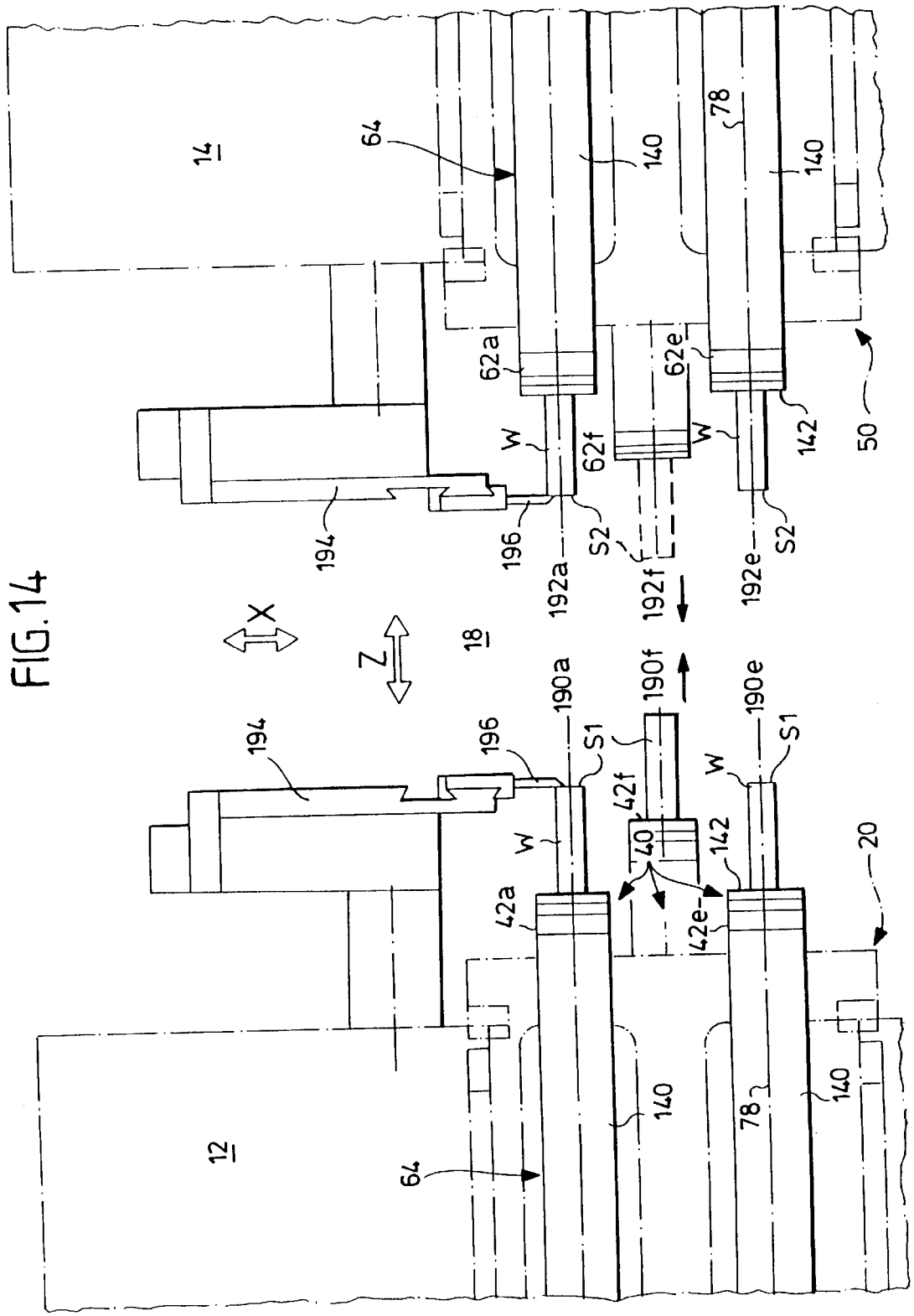
FIG. 14 is a sectional schematic representation of a machining operation of a work piece in a third version.

In a further version of a multiple-spindle turning machine according to the invention, shown in FIG. 14, work piece spindles 140 are also provided in the sleeves 64 as machining means 40 in the cylinder 20, and moreover work piece spindles 140 are also provided in the sleeves 64 in the second cylinder 50, in which case the number of work piece spindles 140 in the two cylinders is identical.

The work piece spindles 140 are arranged with their spindle axes 78 respectively at the same radial distance from the rotational axis 22, and moreover at the same angular distance from one another, so that each of the work piece spindles 140 in each of the cylinders 20, 50 may be positioned in each of the stations 190 and 192.

If the rotary drives 28 and 58 are actuated synchronously by means of the control 240, then the same rotational machining operations are possible as in machines known from the prior art, however with the advantage that the operating area 18 between the faces of both cylinders is completely free, and therefore the work pieces W in the individual stations 190 and 192 are better accessible for the tools 196 and moreover more space is available for arrangement of the tools 196.

In this version, the two work piece spindles 140 respectively opposing one another are also preferably movable in the direction of the central axis 78.

With this version it is now possible to machine the work pieces W, for example, in the station 190*a* and 192*a* respectively by means of the tool 196 arranged respectively on a described carriage 194, in which case by moving the carriage 194, the tools 196 are on the one hand movable relative to the work piece W along the X-axis and on the other hand the work pieces W are movable relative to the tool 196 in the direction of the Z-axis by displacing the corresponding sleeve 64 in the direction of its central axis 78

In this case, in station 190*a*, for example, machining of the work piece W occurs on side S1 and in station 192*a* machining of the work piece W arranged opposite occurs on side S2, i.e. in each station a work piece W is machined on the front side S1 and the opposite work piece W on the rear side S2.

In such a version, it is additionally possible, for example, in stations 190*f* and 192*f*, to carry out a transfer of the work piece W from the work piece spindle 140 in position 42*f* into the work piece spindle 140 in position 62*f* by moving the work piece spindles 140 towards one another in the direction of their central axis 78 and transferring the work piece W from the work piece clamping means 142 in position 42*f* into the work piece clamping means 142 in position 62*f*, so that, for example, in stations 190*a* to 190*e* machining of the front side S1 of the work piece W occurs, in station 190*f* transfer of the work piece W occurs from the work piece spindle 140 in position 42*f* into the work piece spindle 140 in position 62*f* in station 192*f*, and from there in stations 192*a* to 192*e*, machining of the rear side S2 of the work piece W occurs.

Figure 15:
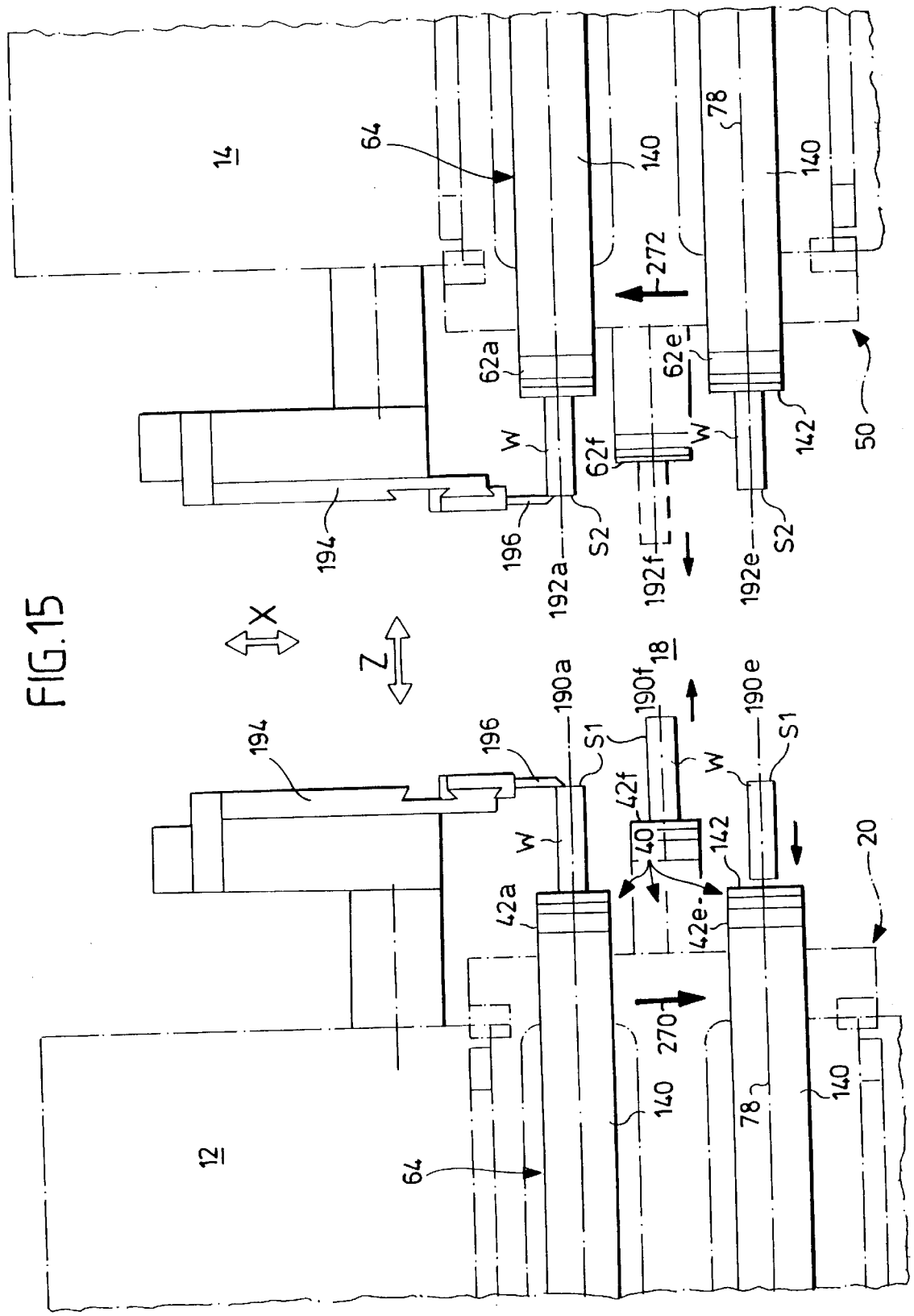
FIG. 15 is a sectional schematic representation of a machining operation of a work piece in a fourth version.

As an alternative to this, it is possible in this version of the multiple-spindle turning machine according to the invention, in stations 190*f* and 192*f*, as shown in FIG. 15, to carry out the transfer of the work piece from the work piece spindle 140 in position 42*f* into the work piece spindle 140 in position 62*f*, but to approach these stations with a different direction of rotation so that, as shown in FIG. 15, for example, the respective directly following work piece spindle 140 comes out of station 190*a* and then stands in station 190*f* to transfer the work piece W, but on the other hand is opposed to cylinder 50, i.e. is rotated in the direction of the arrow 272, so that the directly following work piece spindle 140 in station 192*f* comes out of station 192*e*, in which it is, for example, provided that the work piece W is deposited from the work piece spindle 140 standing in this station in an unloading station, so that the free work piece spindle 140 comes out of station 192*e* into station 192*f*, receives the work piece in this, and the directly following machining operation occurs after the next indexing of the cylinder 50 in station 192*a*.

However, from a loading means a work piece may be inserted as a blank in station 190*e* into the work piece spindle 140 standing in it, in which no further work piece W is held, when the spindle comes out of station 190*f*.

Figure 16:
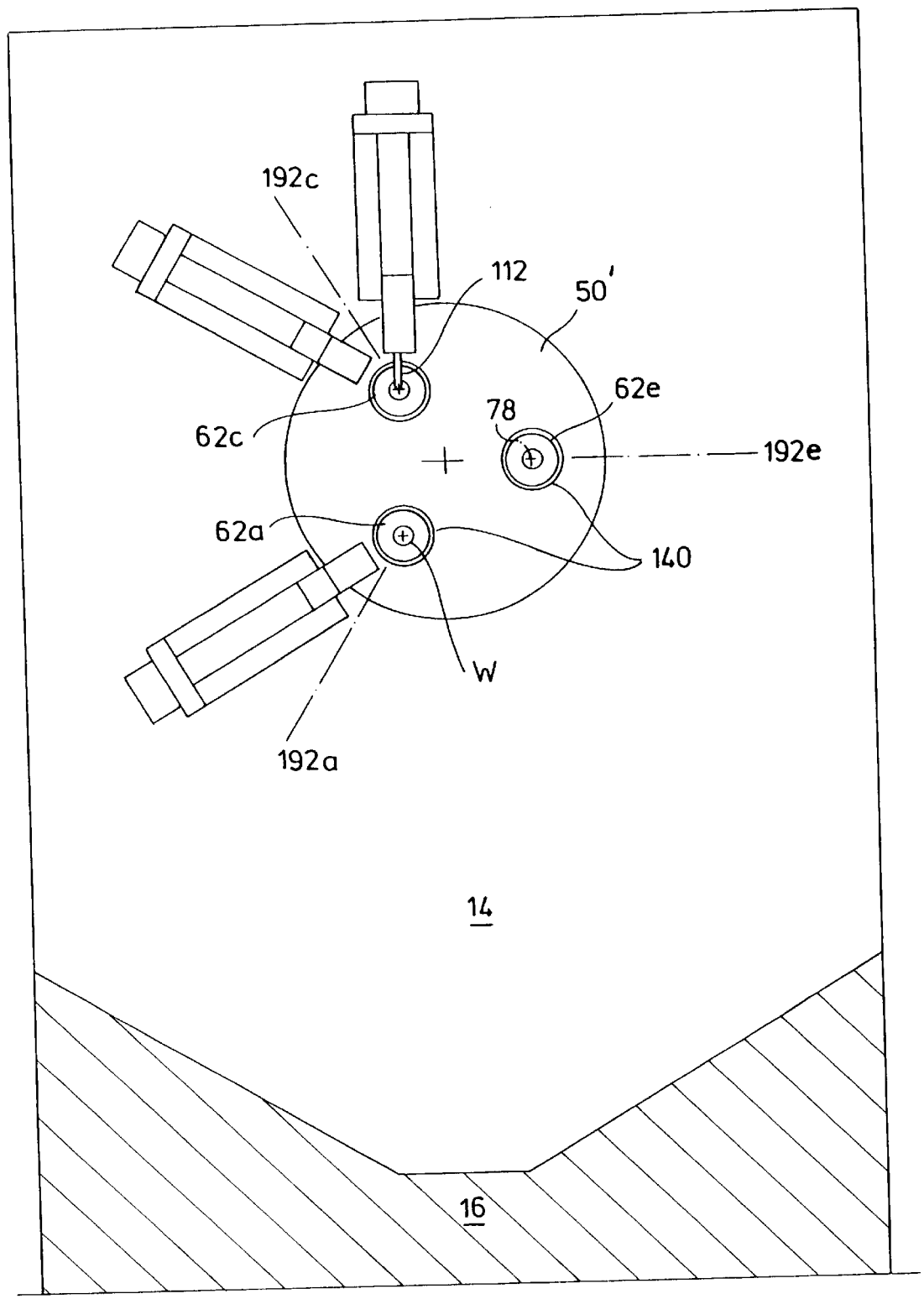
FIG. 16 is a section similar to FIG. 3 in a fifth version.

In a further version of a multiple-spindle turning machine according to the invention, shown in FIG. 16 and shown schematically in FIG. 17, only three work piece spindles 140 are provided in the cylinder 50', and not six work piece spindles as in the case of cylinder 50 and shown in FIG. 3, and that is in positions 62*a*, 62*c* and 62*e* so that these work piece spindles 140 are at an angular distance from one another which is double the angular distance of the work piece spindles 140 in the cylinder 20.

As shown in FIG. 17, in this version of the multiple spindle turning machine according to the invention, for example, it is possible in the case of work spindles 140 standing in stations 190*a* and 192*a* to transfer the work piece W from the work piece spindle 140 standing in position 42*a* into the work piece spindle 140 in position 62*a* and to move this with the work piece spindle 140 in position 62*a* into station 192*c*, and to machine it in station 192*c* by means of a tool 112, for which purpose the cylinder 50' is rotated. In station 192*c*, machining of side S2 may now occur with tool 112 during a period which is completely independent of the machining operations of the work piece W clamped in a work piece spindle 140 of cylinder 20. The single boundary condition for the rotational movement of the cylinder 50' is that for transfer of the work piece W from the work piece spindle 140 standing in station 190*a*, the work piece spindle 140 is available to receive in station 192*a*.

However, in the case of work pieces which are held in work piece spindles 140 sitting in the spindle cylinder 20, it is possible to machine these work pieces W on side S1 in stations 190 and, depending on the direction of rotation of the cylinder 20, in stations 190*c* and 190*b* or in stations 190*e* and 190*f* prior to the transfer in station 190*a*, in which case the period for this machining is also completely independent of the periods of machining on side S2.

Such a different number of work piece spindles 140 in the cylinder 50' may be used, for example, if the machining operations on side S2 require different times and, for example, also a lower number of different tools, while the machining operations of the work piece W on side S1 require a large number of very different tools.

What is claim is:

1. A multiple-spindle turning machine, comprising:
   a machine frame;
   first and second drums arranged on opposite sides of a machining area, and mounted on said machine frame to be respectively rotatable around respective essentially parallel rotational axes;
   said first and second drums being rotatable around said respective rotational axes independently of one another relative to the machine frame;
   machining means arranged on said first and second drums in respective individual positions with associated central axes thereof aligned essentially parallel to the respective rotational axis; and
   tools for machining work pieces held in at least one portion of said machining means.
2. A multiple-spindle turning machine according to claim 1, wherein:
   said first and second drums have respective faces which face one another; and
   said machining area is located between said respective faces and is free from mechanical connections between said first and second drums.
3. A multiple-spindle turning machine according to claim 1, wherein:
   said first and second drums are independently driven by respective rotary drives.
4. A multiple-spindle turning machine according to claim 3, wherein:
   each of said first and second drums is provided with an allocated-rotary drive in a stand of said machine frame; and
   each stand forms a modular unit of the machine frame with the respective drum and rotary drive.
5. A multiple-spindle turning machine according to claim 3, wherein:
   said respective rotary drives are constructed as numerically controlled rotational shaft drives.
6. A multiple-spindle turning machine according to claim 3, wherein:
   said respective rotary drives may be correlated with one another via a control means.
7. A multiple-spindle turning machine according to claim 1, wherein:
   said first and second drums are rotatable around the same rotational axis.
8. A multiple-spindle turning machine according to claim 1, wherein:
   the machining means of said first drum are arranged with the associated central axes at essentially the same radial distance from the rotational axis of said first drum.
9. A multiple-spindle turning machine according to claim 1, wherein:
   the machining means of said first drum are arranged around the rotational axis of the first drum at substantially the same angular distance from one another.
10. A multiple-spindle turning machine according to claim 1, wherein:
    the machining means on the first and second drums are arranged at substantially the same radial distance from the respective rotational axis of the respective drum.
11. A multiple-spindle turning machine according to claim 1, wherein:
    said first and second drums have the same number of machining means.
12. A multiple-spindle turning machine according to claim 11, wherein:
    the machining means are arranged at equal angular distances from one another around the respective rotational axes of said first and second drums.
13. A multiple-spindle turning machine according to claim 1, wherein:
    said first drum has a smaller number of machining means than said second drum.
14. A multiple-spindle turning machine according to claim 1, wherein:
    at least one portion of the machining means is constructed as a work piece spindle.
15. A multiple-spindle turning machine according to claim 14, wherein:
    the machining means of at least said first drum are constructed as work piece spindles.
16. A multiple-spindle turning machine according to claim 1, wherein:
    at least one of the machining means is movable in a direction of the associate central axis relative to the associated drum.

17. A multiple-spindle turning machine according to claim 16, wherein:

the machining means are movable independently of one another in the direction of their associated central axes relative to the associated drum.

18. A multiple-spindle turning machine according to claim 17, wherein:

each machining means movable in the direction of its associated central axis is allocated its own linear drive.

19. A multiple-spindle turning machine according to claim 18, wherein:

each machining means is constantly coupled to the respective linear drive.

20. A multiple-spindle turning machine according to claim 18, wherein:

the machining means can be specifically positioned and fixed with respect to its position in the direction of the associated central axis by means of the linear drive.

21. A multiple-spindle turning machine according to claim 18, wherein:

the linear drive is arranged on the respective drum.

22. A multiple-spindle turning machine according to claim 16, wherein:

each machining means is solely linearly movable relative to the respective drum.

23. A multiple-spindle turning machine according to claim 1, wherein:

each of said first and second drums may be rotated from an initial position around a maximum angle as far as an end position in one direction, and then back again in the opposite direction into the initial position; and a flexible supply strand which follows the rotational movement around the maximum angle is directed from the machine frame to the respective drum.

24. A multiple-spindle turning machine according to claim 1, wherein:

said essentially parallel rotational axes are also horizontal.

* * * * *

UNITED STATES PATENT AND TRADEMARK OFFICE
CERTIFICATE OF CORRECTION

PATENT NO. : 5,768,962
DATED : June 23, 1998
INVENTOR(S) : Link et al.

It is certified that error appears in the above-identified patent and that said Letters Patent is hereby corrected as shown below:

On title page, item [63],

Continuation-in-part of PCT/EP96/00495 Feb. 6, 1996, is changed to:

-- [63] Continuation of application No. PCT/EP96/00495, Feb. 6, 1996--

In column 1, line 2, "continuation-in-part" is changed to:

-- continuation --.

Signed and Sealed this

Eighteenth Day of April, 2000

Attest:

Q. TODD DICKINSON

*Attesting Officer*   *Director of Patents and Trademarks*